INVENTOR
W. F. BOLDT
BY

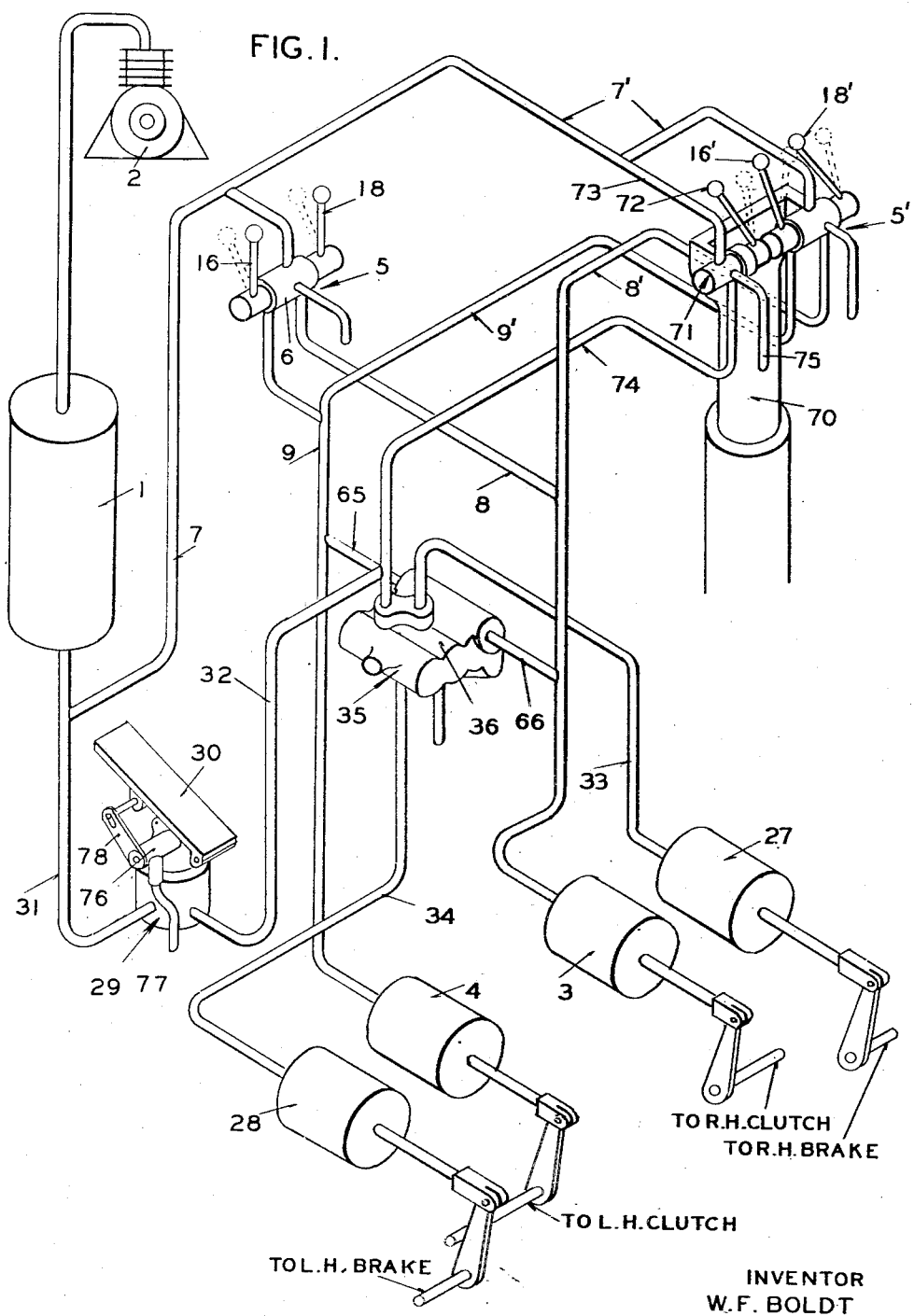

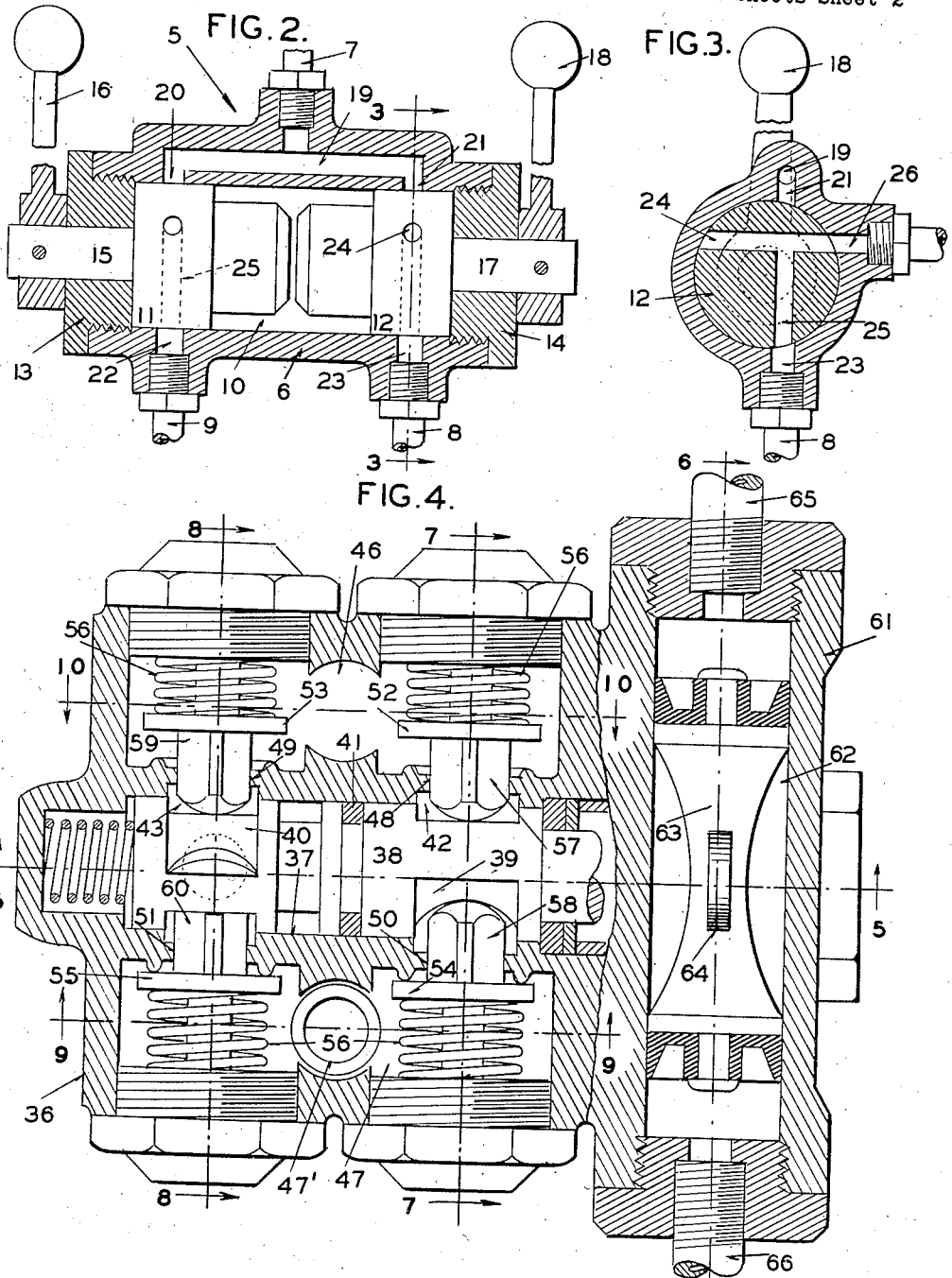
Sept. 7, 1943. W. F. BOLDT 2,328,606
CLUTCH AND BRAKE CONTROL SYSTEM
Filed April 2, 1942 4 Sheets-Sheet 2
INVENTOR
W. F. BOLDT
BY
ATTORNEY Sept. 7, 1943.                    W. F. BOLDT                    2,328,606
                         CLUTCH AND BRAKE CONTROL SYSTEM
                             Filed April 2, 1942                4 Sheets-Sheet 3

Sept. 7, 1943.  W. F. BOLDT  2,328,606
CLUTCH AND BRAKE CONTROL SYSTEM
Filed April 2, 1942  4 Sheets-Sheet 4
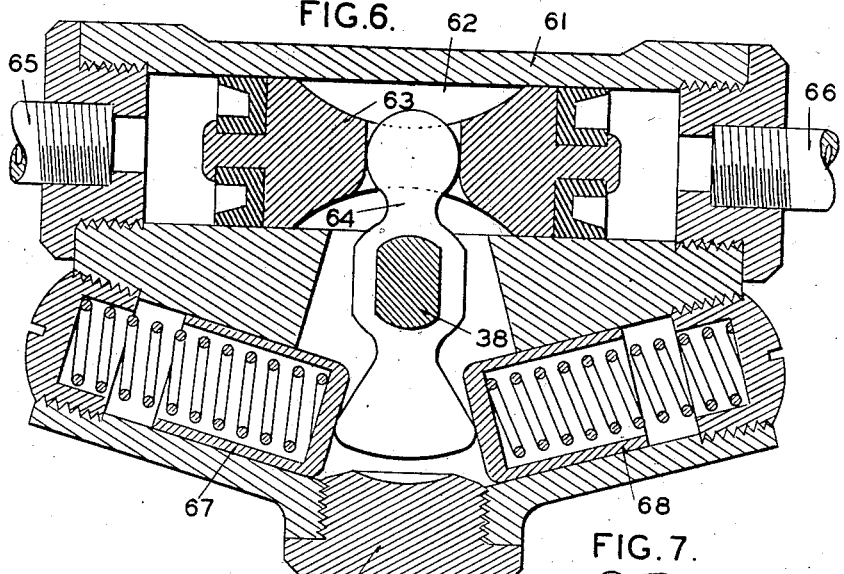
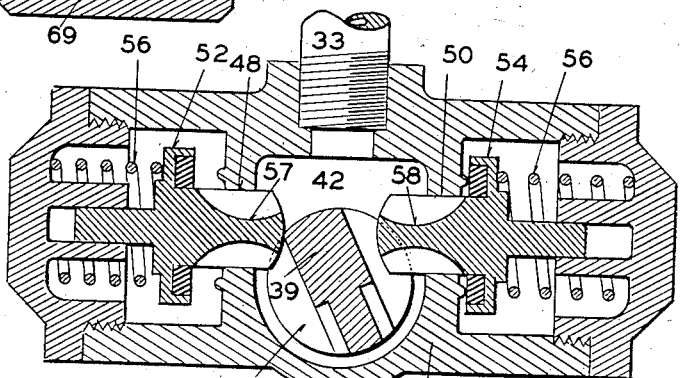
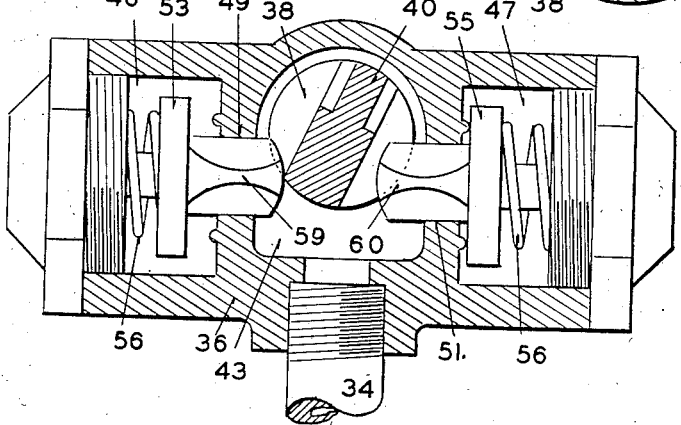
INVENTOR
W. F. BOLDT
BY
E. E. Huffman
ATTORNEY Patented Sept. 7, 1943

2,328,606

UNITED STATES PATENT OFFICE 2,328,606

CLUTCH AND BRAKE CONTROL SYSTEM

Werner F. Boldt, Clayton, Mo., assignor to Wagner Electric Corporation, St. Louis, Mo., a corporation of Delaware Application April 2, 1942, Serial No. 437,325

15 Claims. (Cl. 303—6)

My invention relates to control systems and more particularly to a control system for clutches and brakes whereby a vehicle may be steered.

One of the objects of my invention is to provide an improved clutch and brake control system for a vehicle in which the steering thereof is accomplished by first disconnecting the driven member on one side of the vehicle and then subsequently applying a brake thereto to prevent or retard its movement.

Another and more specific object of my invention is to provide an improved control system for steering and braking a track laying type of vehicle such as a military tank and to so arrange said control system that it can be operated from two separate places in the vehicle.

Still another object of my invention is to provide a fluid pressure actuated control system for the clutches and brakes of a vehicle which will be so arranged that either of two clutches can be disengaged at will and upon said disengagement the braking system will automatically be so conditioned that only the proper brake can be applied to assist in steering the vehicle.

Figure 5:
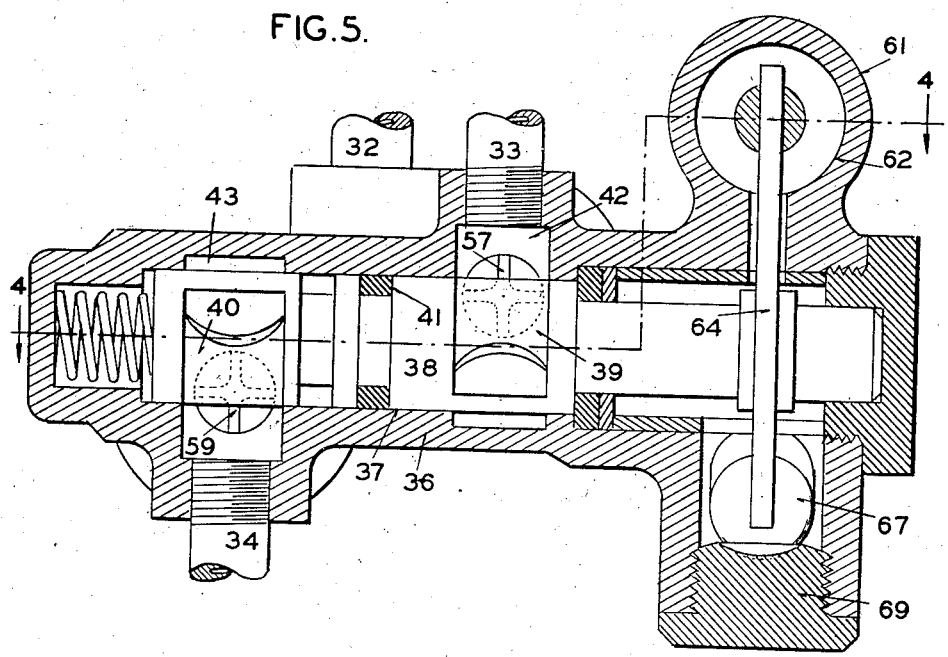
Figure 9:
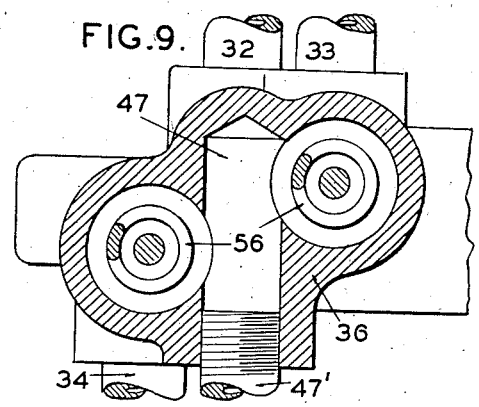
Figure 10:
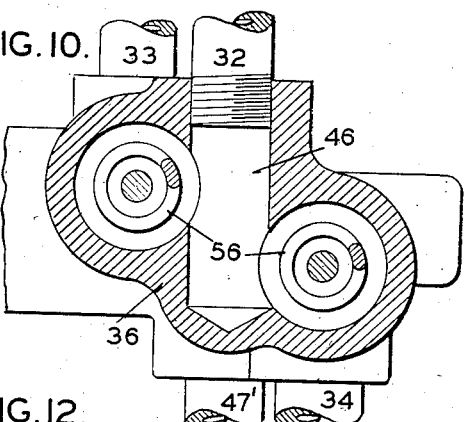
Figure 11:
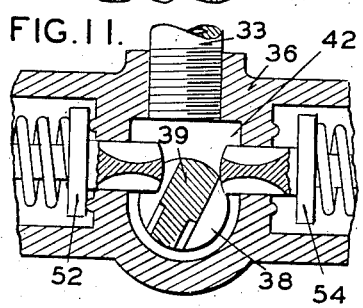
Figure 12:
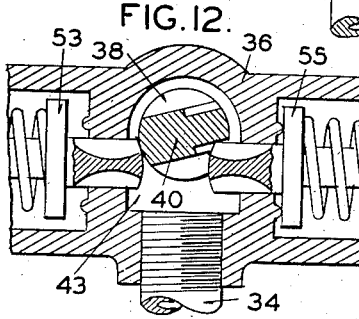

Other objects of my invention will become apparent from the following description taken in connection with the accompanying drawings, in which Figure 1 is a schematic view of a clutch and brake control system embodying my invention; Figure 2 is a sectional view of the clutch controlling valves; Figure 3 is a sectional view taken on the line 3—3 of Figure 2; Figure 4 is a sectional view of the control valve mechanism for the brakes, said view being taken on the line 4—4 of Figure 5; Figure 5 is a sectional view taken on the line 5—5 of Figure 4; Figure 6 is a sectional view taken on the line 6—6 of Figure 4; Figures 7, 8, 9, and 10 are various sectional views showing details, said views being taken on lines 7—7, 8—8, 9—9, 10—10, respectively, of Figure 4; and Figures 11 and 12 are sectional views similar to Figures 7 and 8 but showing the valve elements and the control shaft in different positions.

Referring first to Figure 1, the fluid pressure employed in the control system is preferably compressed air although other fluids may be employed. This compressed air is stored in tank 1 after being compressed by a compressor 2. The clutch for disconnecting the right-hand track of the tank (not shown) from the source of power or engine is operated by a power cylinder 3 and the clutch for disengaging the left-hand track from the source of power is controlled by a power cylinder 4. Both power cylinders are adapted to be connected to the storage tank 1 and are controlled by suitable hand-operated valve mechanism generally indicated by the numeral 5 and embodying two separate valves enclosed in a single casing 6. This casing is connected to the storage tank by a conduit 7 and to the power cylinders 3 and 4 by means of conduits 8 and 9, respectively.

The construction of the valve mechanism is shown in detail in Figures 2 and 3. The casing 6 is provided with a through-bore 10 in which is positioned rotatable valve elements 11 and 12 held in axial abutting relation by the plugs 13 and 14 closing the ends of the bore. The valve element 11, which controls the left-hand clutch actuating power cylinder 4, is provided with a shaft portion 15 which extends through plug 13 and carries a control handle 16. Similarly, the valve element 12 has a shaft portion 17 extending through plug 14 and carries the handle 18. The conduit 7 leading from the storage tank communicates with a passage 19 in the wall of the casing, said passage communicating with spaced ports 20 and 21 entering the bore, the former for association with the valve element 11 and the latter for association with valve element 12. The bore 10 opposite port 20 has a port 22 to which conduit 9 is connected which leads to power cylinder 4. A port 23 is opposite port 21 and this port is connected to conduit 8 leading to the power cylinder 3.

As best shown in Figure 3, each valve element has a cross-passage 24 and an interconnecting branch passage 25 at right angles thereto. When handles 16 and 18 are in their vertical positions, each cross-passage 24 will communicate with an atmospheric port 26 in the valve casing. When handles 16 and 18 are in their vertical positions the valve elements will be in the positions shown in Figure 3. Under these conditions both power cylinder 3 and 4 will be in communication with the atmosphere and the storage tank will be cut off. If handle 18 should be swung in a clockwise direction, as viewed in Figure 3, to the position where ports 21 and 23 are placed in communication with each other by way of passage 24, then the power cylinder 3 will be operated and the right-hand clutch disengaged. A similar movement of handle 16 will cause the storage tank to be connected to the power cylinder 4 and the left-hand clutch disengaged. If handle 18 should be moved in a counter-clockwise direction (to dotted position in Figure 1) in order to cause passage 25 to no longer communicate with port 23, then the power cylinder 3 will be cut off from communication with atmosphere. Similar movement of handle 16 will also cut off communication between the power cylinder and the atmosphere.

When the clutch operating system just described is employed in a tank, the valve mechanism 5 is positioned in a convenient place so that the handles can be manipulated by the driver of the tank who sits in the lower part thereof.

In a track laying tank or like vehicle there is also associated with the track a brake whereby the track can be held from moving. When the driving power of the track is disconnected as by disengaging the clutch, the tank can be caused to make a short turn by braking the track which is no longer driven from the engine. By holding the track stationary, the tank will pivot on this track and make an extremely short turn. The turning angle may be varied by wholly or partially releasing the brake. In the control system shown, the brake for the right-hand track is adapted to be applied by a power cylinder 27 and the brake for the left-hand track is adapted to be applied by a power cylinder 28. These power cylinders are operated by fluid pressure from the storage tank 1 and to control them there is provided a master valve 29 of well-known construction, said valve being controlled by a treadle 30 convenient to the driver of the tank. A conduit 31 connects this master valve to the tank and a conduit 32 and branch conduits 33 and 34 lead from the valve to the power cylinders 27 and 28. Between conduit 32 and branch conduits 33 and 34 leading to the power cylinders, I have provided a special control valve mechanism 35 which is adapted to automatically select the power cylinder to be actuated and the brake thereof applied corresponding to the clutch which is disengaged.

Referring now to Figures 4 to 12, inclusive, which disclose details of the control valve mechanism 35, said valve mechanism is embodied in a casing 36 which has a bore 37 in which is mounted a shaft 38 having spaced cams 39 and 40. The central part of the shaft between the cams is provided with a packing 41 which divides the bore into chambers 42 and 43 with cam 39 in chamber 42 and cam 40 in chamber 43. The chamber 42 has a port 44 to which is connected conduit 33 leading to the right power cylinder 27 and chamber 43 has a port 45 to which is connected conduit 34 leading to the left power cylinder 28.

On opposite sides of bore 37 are chambers 46 and 47, chamber 46 being connected to conduit 32 leading from the master control valve 29 and chamber 47 being connected to an exhaust conduit 47' opening to atmosphere. A passage 48 connects chamber 46 to chamber 42 and a passage 49 connects said chamber 46 to chamber 43. Also, a passage 50 connects chamber 47 to chamber 42 and a passage 51 connects said chamber 47 to chamber 43. The passages 48 and 50 are in axial alignment and lie slightly above the axis of bore 37. The passages 49 and 51 are in alignment and lie slightly below the axis of bore 37.

Valve elements 52, 53, 54, and 55 control the passages 48, 49, 50, and 51, respectively, and are normally biased toward closed position by springs 56. The valve elements 52 and 54 have fluted stems 57 and 58 which project into chamber 42 and are adapted to cooperate with the opposite sides of cam 39 on shaft 38. In a like manner the valve elements 53 and 55 are provided with fluted stems 59 and 60 which project into chamber 43 and cooperate with the opposite sides of cam 40. The cams are so arranged with respect to each other that when the shaft is in its normal or inoperative position, cam 39 will hold valve 52 open and permit closing of valve 54 and cam 40 will hold valve element 53 open and permit closing of valve element 55. It is thus seen that under these conditions chamber 46, which communicates with the foot-operated master valve 29, will be in constant communication with chambers 42 and 43 and since these chambers are in communication with the power cylinders 27 and 28, respectively, said power cylinders will be in communication with valve 29 so that if said valve is operated to permit fluid under pressure to flow to conduit 32, the power cylinders will be simultaneously operated. The normal position of the shaft and the condition of the valve elements are shown in Figures 4 to 8.

As best shown in Figures 4, 5, and 6, the casing 36 is formed with an extension portion 61 provided with a cylinder 62 which is at right angles to bore 37 and slightly above the axis of said bore. Within this cylinder is a double-headed piston 63, the central portion of which receives the end of a lever 64 which is connected intermediate its ends to the end of shaft 38. The left-hand end of cylinder 62 (as viewed in Figures 4 and 6) is connected to a conduit 65 which communicates with the previously referred to conduit 9 leading to the power cylinder 4 for actuating the left-hand clutch. The right end of cylinder 62 is connected to a branch conduit 66 which communicates with the previously referred to conduit 8 leading to the power cylinder 3 for actuating the right-hand clutch. By means of this structure it is seen that when fluid under pressure is established in the power cylinder 4 only the piston will be moved to the right and thereby rotate shaft 38 in a clockwise direction as viewed in Figure 6. When fluid pressure is established in the power cylinder 3, piston 63 will be moved to the left and will cause a counter-clockwise rotation of shaft 38, as viewed in Figure 6. In order that piston 63 may be biased to a central position when no fluid pressure is acting on either end of piston 63, there are provided spring plungers 67 and 68 to act upon opposite sides of the lower end of lever 64. The ends of the plungers abut against a central stop 69 when the piston and shaft are in their central positions. This central position is the normal position of the shaft as is shown in Figures 4 to 8. When the piston is moved to the right, the spring-pressed plunger 67 will be moved and act to return the piston to its central position and when the piston is moved to the left, the spring-pressed plunger 68 will be moved and act to return the piston to its central position.

Referring now to the operation of the control system so far described, when the clutch valve controlling handles are in their positions shown, both clutches will be in engagement. Under these conditions, the parts of the control valve mechanism 35 will be in the positions shown in Figures 4 to 10. If the foot-operated valve 29 is actuated by the treadle, both brakes can be applied since the valve elements 52 and 53 are held open and the valve elements 54 and 55 are in their closed position. If the brakes are not applied and it is desired to employ the brakes to assist in making a left-hand turn, the left-hand handle 16 will be pulled rearwardly, thereby connecting the power cylinder 4 to the source of pressure. This will disengage the left-hand clutch. Simultaneously with the disengagement of the left-hand clutch, the fluid under pressure admitted to conduit 9 will also be effective to move piston 63 to the right from its central position, as shown in Figures 4 and 6. The movement of this piston will now cause clockwise rotation of shaft 38, as viewed in Figure 6, thereby so moving cams 39 and 40 that the valve element 52 will be closed and valve element 54 opened without any change in the condition of the valve elements 53 and 55, that is, the valve element 53 remains open and the valve element 54 remains closed. The condition of all the valve elements 52, 53, 54, and 55 is shown in Figures 11 and 12 after the shaft 38 is rotated in a clockwise direction as viewed in Figures 6, 7, and 8. If the treadle-controlled valve 29 is now opened to connect conduit 32 to the source of pressure, only the power cylinder 28 will be operated, thereby applying the left-hand brake. The right-hand brake cannot be applied because the valve element 52 has been closed. It is thus seen that with the disengagement of the left-hand clutch and the application of the left-hand brake, the track on that side of the tank will be held stationary and the tank can pivot about this track and make the required turn. Release of valve 29 will release the brakes and a return of handle 16 will permit re-engagement of the clutch.

If it is desired to employ the brakes to assist in steering to the right, the right-hand handle 18 is pulled rearwardly, thereby disengaging the right-hand clutch. The fluid pressure admitted to conduit 8 will also be effective to move piston 63 to the left and cause a counter-clockwise rotation of shaft 38 as viewed in Figures 6, 7, and 8. Cams 39 and 40 will now be so rotated that the valve element 53 will be closed and valve element 55 opened and valve element 52 continued to be held open and valve element 54 continued to be held closed. When valve 29 is now opened, the right-hand brake only will be applied as fluid pressure is prevented from flowing to the left-hand brake power cylinder 28. The return of handle 18 to its straight-up position will cause re-engagement of the clutch and release of the treadle will permit release of the right-hand brake.

If valve 29 should continue to be held open after the clutch is permitted to become re-engaged, then piston 63 will be returned to its central position and under these conditions the cams will be again positioned as shown in Figures 4 to 8 where both valve elements 52 and 53 will be open and both valve elements 54 and 55 closed. Thus the brake which has not been applied will be applied by air pressure since the valve shutting it off has been opened.

If both brakes should be applied when it is desired to disengage the clutch to assist in steering, then when the clutch is disengaged and piston 63 is moved, the brake on the side of the vehicle opposite the disengaged clutch will be automatically released. Thus, for example, if the right-hand clutch is disengaged when both brakes are in applied condition, piston 63 will be moved to the left. This will cause a counter-clockwise rotation of the shaft (as viewed in Figures 6, 7, and 8) and result in cam 40 permitting the closing of valve element 53 and the opening of valve element 55. This will now place the power cylinder 28 of the left-hand brake in communication with atmosphere and cause release of the brake. If the left-hand clutch had been disengaged when the brakes were applied, then, of course, the right-hand brake would have been released in an obvious manner since the valve element 52 would be closed and the valve element 54 would be opened.

If it should be desired to disengage both clutches simultaneously, both handles will be pulled rearwardly. This, of course, will result in the establishment of equal pressures on opposite ends of piston 63 and consequently the piston will not be moved. Under these conditions both brakes can be applied since valve elements 52 and 53 will remain open and valve elements 54 and 55 will remain closed.

From the foregoing it is seen that there is provided a control system for the clutches and brakes of a track vehicle, such as a tank, which will permit the operator to properly control the clutches and brakes to accomplish a desired steering of the vehicle. Both brakes can be applied at any time when the clutches are engaged. When the right-hand clutch is disengaged, only the right-hand brake can be applied regardless of whether the brakes were applied before or after the disengagement of the clutch. If the left-hand clutch is disengaged, only the left-hand brake can be applied regardless of whether the brakes were applied prior to or after the disengagement of said clutch. If both clutches are disengaged, both brakes can be applied in the same manner as though both clutches were engaged.

In tank operation, the driver in the presently constructed tanks does all the driving under all conditions and he receives his instructions from the commanding officer in the turret who transmits his desires to the driver by means of signals through his feet such as tapping the driver on the back. The driver thus executes the orders and moves the tank in the direction desired. Under certain conditions it may be desirable to relieve the regular driver of his duties and permit the commanding officer in the turret to do the driving. Such would be desirable when the tank is being moved across country and is not under combat. The commanding officer in the turret can not only see what he wants to do but can do his own driving which he is free to do as he does not have any combat duties to perform. With the control system just described it is very easy to so adapt it that it can also be operated by the commanding officer.

Referring again to Figure 1, a second set of controls can be employed in a convenient place where the commanding officer in the turret desires these controls. These controls can be mounted upon an adjustable column 70 so that they can be brought into position for the commanding officer or lowered out of his way during combat. On the top of the adjustable column 70 there is mounted a control valve mechanism 5' which is identical with the control valve mechanism 5. The conduit 7' is connected to conduit 7 in order to obtain fluid pressure from the source and conduits 8' and 9' connect the valves to conduits 8 and 9. By operating the handles 16' and 18', the clutches can be controlled in the same manner as when handles 16 and 18 are controlled. However, before controlling the clutches by handles 16' and 18', it will be necessary to shut off the power cylinders 3 and 4 from communication with the atmosphere through valve mechanism 5. This can be accomplished by moving handles 16 and 18 forwardly to their dotted line positions so that passages 25 are out of communication with the cooperating ports 22 and 23.

Also mounted on the control column 70 is a valve 71 which is controlled by a handle 72. This valve may be of any type such as, for example, the ordinary three-way valve. The valve is connected to the source of pressure by a conduit 73 which is connected into conduit 7'. A second conduit 74 places the valve in communication with conduit 32 leading from the foot-operated control valve 29. An exhaust connection is obtained through conduit 75. When handle 72 is moved forwardly, it will shut off the exhaust conduit 75 and when it is moved rearwardly to the position shown, it will admit air under pressure from the source to the brake operating power cylinder or cylinders, depending upon whether only one is in communication with conduit 32 or both are in communication with conduit 32. In order that the exhaust port of the foot-operated valve 29 will not be in an open position when the commanding officer desires to use the hand-operated valve 71, there is provided a shut-off valve 76 for the exhaust conduit 77 of said valve 29. This shut-off valve 76 is adapted to be controlled by treadle 30 through a suitable linkage 78. When treadle 30 is permitted to be released beyond its normally released position, valve 76 will be closed. Thus when fluid pressure is admitted to conduit 32 through valve 71, it will not escape to atmosphere but will cause proper operation of the power cylinders 27 and 28.

When the commanding officer wants to return the control to the driver, all he need do is to position the handles 72, 18' and 18' forwardly from their upright positions. This will then cut off any communication between the various power cylinders and the atmosphere. The column 70 can then be lowered so that the valves 5' and 71 will be out of the way. The driver can then control the clutches and brakes in the manner already described. It is thus seen that the operation of the system can be shifted back and forth from the driver to the commanding officer as desired.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, a main valve for placing the source of fluid pressure in communication with the motors through the conduit means, and means for selectively causing either of the fluid motors to be cut off from communication with the source of fluid pressure and placed in communication with a body of fluid at atmospheric pressure.

2. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, a main valve for placing the source of fluid pressure in communication with the motors through the conduit means, valve means for preventing the source of pressure from communicating with the fluid motor of the brake on one side of the vehicle and for placing said fluid motor in communication with a body of fluid at atmospheric pressure, other valve means for preventing the source of pressure from communicating with the fluid motor of the brake on the other side of the vehicle and for placing said last named fluid motor in communication with a body of fluid at atmospheric pressure, and means for selectively controlling said two last named valve means.

3. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, a main valve for placing the source of fluid pressure in communication with the motors through the conduit means, means for selectively causing either of the fluid motors to be cut off from communication with the source of fluid pressure and placed in communication with a body of fluid at atmospheric pressure, and fluid pressure operated means comprising an operator-operated control valve means for controlling said last named means at will.

4. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, valve means for placing the source of fluid pressure in communication with the motors through the conduit means, a valve for cutting off communication between the source of fluid pressure and each of the fluid motors, a valve for placing each fluid motor in communication with a body of fluid at atmospheric pressure, a single member for controlling said four last named valves and normally maintaining said cut off valves in open position and the other valves in closed position, and means for moving said member in opposite directions from said normal position, said member when moved in one direction rendering the cut-off valve of one fluid motor closed and the other valve of said motor open and when moved in the opposite direction rendering the cut-off valve of the other motor closed and said other valve of said motor open.

5. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, valve means for placing the source of fluid pressure in communication with the motors through the conduit means, a valve for cutting off communication between the source of fluid pressure and each of the fluid motors, a valve for placing each fluid motor in communication with a body of fluid at atmospheric pressure, a single member for controlling said four last named valves and normally maintaining said cut-off valves in open position and the other valves in closed position, and fluid pressure operated means for selectively moving said member in opposite directions from said normal position, said member when moved in one direction rendering the cut-off valve of one fluid motor closed and the other valve of said motor open and when moved in the opposite direction rendering the cut-off valve of the other motor closed and said other valve of said motor open.

6. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, valve means for placing the source of fluid pressure in communication with the motors through the conduit means, a valve for cutting off communication between the source of fluid pressure and each of the fluid motors, a valve for placing each fluid motor in communication with a body of fluid at atmospheric pressure, a shaft provided with cams for controlling said four last named valves and normally maintaining said cut-off valves in open position and the other valves in closed position, and means for rotating said shaft in opposite directions from said normal position, said shaft when moved in one direction so controlling the valves by the cams that the cut-off valve of one fluid motor will be closed and the other valve of said motor will be opened and when moved in the opposite direction the cut-off valve of the other motor will be closed and the other valve of said motor will be opened.

7. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, valve means for placing the source of fluid pressure in communication with the motors through the conduit means, a valve for cutting off communication between the source of fluid pressure and each of the fluid motors, a valve for placing each fluid motor in communication with a body of fluid at atmospheric pressure, a single member for controlling said valves, means for normally biasing said member to a position where said cut-off valves will be in open position and the other valves will be in closed position, a fluid motor having a movable element connected to move said member in opposite directions from said normal position, said member when moved in one direction from said normal position so controlling the cut-off valves that the cut-off valve of one brake fluid motor will be closed and the other valve of said brake motor will be open and when moved in the opposite direction the cut-off valve of the other brake motor will be closed and the other valve of said brake motor will be open, and manually-controlled valves for selectively admitting fluid pressure to opposite sides of the movable element of the fluid motor for moving the movable member which controls the valves.

8. In a fluid pressure control system for a vehicle having a driven member on each side thereof adapted to be disconnected from a source of power and an associated brake for each member, a fluid motor for applying each brake, a source of fluid pressure, conduit means between the source of fluid pressure and each fluid motor, operator-operated valve means for simultaneously placing the source of fluid pressure in communication with both motors through the conduit means, means for independently disconnecting the driven members from the source of power, and valve means operable when one of the driven members is disconnected for preventing the source of fluid pressure from communicating through the first named valve means when open with the fluid motor of the brake on the side of the vehicle opposite the disconnected member and for placing said fluid motor in communication with a body of fluid at atmospheric pressure.

9. In a fluid pressure control system for a vehicle having a driven member on each side thereof adapted to be disconnected from a source of power and an associated brake for each member, a fluid motor for disconnecting each member, a fluid motor for applying each brake, a source of fluid pressure, conduit means between the source and each fluid motor, independently operated valves for placing the source of fluid pressure in communication with the disconnecting motors, valve means for controlling the simultaneous connecting of the source with both brake fluid motors, and means controlled by the operation of a disconnecting motor on one side of the vehicle for cutting off communication between the source and the fluid motor of the brake on the other side of the vehicle when the last named valve means is open.

10. In a fluid pressure control system for a vehicle having a driven member on each side thereof adapted to be disconnected from a source of power and an associated brake for each member, a fluid motor for disconnecting each member, a fluid motor for applying each brake, a source of fluid pressure, conduit means between the source and each fluid motor, independently operated valves for placing the source of fluid pressure in communication with the disconnecting motors, valve means for controlling the connecting of the source with both brake fluid motors, cut-off valve means for each brake fluid motor, and means controlled by the fluid pressure employed to operate the disconnecting fluid motor on one side of the vehicle for closing the cut-off valve means of the brake fluid motor on the other side of the vehicle.

11. In a fluid pressure control system for a vehicle having a driven member on each side thereof adapted to be disconnected from a source of power and an associated brake for each member, a source of fluid pressure, a fluid motor for disconnecting each member from the source of power, valve means for selectively connecting each disconnecting fluid motor to the source of fluid pressure, a fluid motor for applying each brake, conduit means between the source and each brake fluid motor, a main valve for placing the source of pressure in communication with both brake fluid motors, means operable by the fluid pressure employed to operate the fluid motor of the disconnecting means on one side of the vehicle for causing the fluid motor of the brake on the opposite side of the vehicle to be cut off from communication with the source of pressure and placed in communication with atmosphere, and means operable by the fluid pressure employed to operate the fluid motor of the disconnecting means on the other side of the vehicle for causing the fluid motor of the brake on the opposite side of the vehicle to be cut off from communication with the source of pressure and placed in communication with the atmosphere.

12. In a fluid pressure control system for a vehicle having a driven member on each side thereof adapted to be disconnected from a source of power and an associated brake for each member, a source of fluid pressure, a fluid motor for disconnecting each member from the source of power, valve means for selectively connecting each disconnecting fluid motor to the source of fluid pressure, a fluid motor for applying each brake, conduit means between the source and each brake fluid motor, a main valve for placing the source of pressure in communication with both brake fluid motors, valve means for preventing the source of pressure from communicating with the fluid motor of the brake on one side of the vehicle and for placing said fluid motor in communication with atmosphere, other valve means for preventing the source of pressure from communicating with the fluid motor of the brake on the other side of the vehicle and for placing said last named fluid motor in communication with atmosphere, and fluid pressure-operated means for controlling said two last named valve means, said fluid pressure-operated means being connected to the fluid pressure means of the disconnecting fluid motors in such a manner that when the member on one side of the vehicle is disconnected said fluid pressure-operated means will cause the valve means for the fluid motor of the brake on the opposite side of the vehicle to be operated.

13. In a fluid pressure control system for a vehicle having a driven member on each side thereof adapted to be disconnected from a source of power and an associated brake for each member, a source of fluid pressure, a fluid motor for disconnecting each member from the source of power, valve means for selectively connecting each disconnecting fluid motor to the source of fluid pressure, a fluid motor for applying each brake, conduit means between the source and each brake fluid motor, a main valve for placing the source of pressure in communication with both brake fluid motors, a valve for cutting off communication between the source of fluid pressure and each of the fluid motors, a valve for placing each fluid motor in communication with atmosphere, a single member for controlling said four last named valves and normally maintaining said cut-off valves in open position and the other valves in closed position, means for so moving said single member by the fluid pressure established to operate the disconnecting fluid motor on one side of the vehicle that the two valves associated with the brake fluid motor on the opposite side of the vehicle will be operated to cut off said brake fluid motor from the source of fluid pressure and place it in communication with atmosphere, and means for so moving said single member by the fluid pressure established to operate the disconnecting fluid motor on the other side of the vehicle that the two valves associated with the brake fluid motor on the opposite side of the vehicle will be operated to cut off said brake fluid motor from the source of fluid pressure and place it in communication with atmosphere.

14. In a fluid pressure control system for a vehicle having a driven member on each side thereof adapted to be disconnected from a source of power and an associated brake for each member, a source of fluid pressure, a fluid motor for disconnecting each member, means comprising a set of separate valves for controlling communication between the source of fluid pressure and the disconnecting fluid motors, other means comprising a second set of separate valves for also controlling communication between the source of fluid pressure and the disconnecting fluid motors, means comprising a valve for placing the source of fluid pressure in communication with both brake applying fluid motors, means comprising a second valve for also placing the source of fluid pressure in communication with both brake applying fluid motors, one set of the separate valves for the disconnecting motors and a valve for the brake fluid motors being grouped together and remotely positioned from the other set of separate valves for the disconnecting motors and the other valve for the brake operating fluid motors so that an operator may control the disconnecting and brake applying motors from either of two remote positions, and means controlled by the operation of the disconnecting motor on one side of the vehicle for cutting off communication between the source of fluid pressure and the fluid motor of the brake on the other side of the vehicle.

15. In a fluid pressure control system for a vehicle having a driven member on each side thereof adapted to be disconnected from a source of power and an associated brake for each member, a source of fluid pressure, a fluid motor for disconnecting each member, means comprising a set of separate hand-operated valves for controlling communication between the source of fluid pressure and the disconnecting fluid motors, other means comprising a second set of separate hand-operated valves for also controlling communication between the source of fluid pressure and the disconnecting fluid motors, means comprising a foot-operated valve for placing the source of fluid pressure in communication with both brake applying fluid motors, means comprising a hand-operated valve for also placing the source of fluid pressure in communication with both brake applying fluid motors, one set of the separate valves for the disconnecting motors and the foot-operated valve for the brake fluid motors being so positioned that they can all be controlled by an operator and the other set of separate valves for the disconnecting motors and the hand-operated valve for the brake fluid motors being grouped together and positioned remotely from the other valves so as to be operable by an operator at said remote position, and means controlled by the operation of the disconnecting motor on one side of the vehicle for cutting off communication between the source of fluid pressure and the fluid motor of the brake on the other side of the vehicle.

WERNER F. BOLDT.